(12) United States Patent
Williams (10) Patent No.: US 9,622,097 B2
(45) Date of Patent: Apr. 11, 2017

(54) ENERGY MONITORING IN A COMMUNCIATION LINK

(71) Applicant: Cable Television Laboratories, Inc., Louisville, CO (US)

(72) Inventor: Thomas H. Williams, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 107 days.

(21) Appl. No.: 14/621,842

(22) Filed: Feb. 13, 2015

(65) Prior Publication Data

US 2015/0229416 A1    Aug. 13, 2015

Related U.S. Application Data (60) Provisional application No. 61/939,375, filed on Feb. 13, 2014, provisional application No. 62/030,270, filed on Jul. 29, 2014.

(51) Int. Cl.
| | | |
|---|---|---|
| *H04B 3/46* | (2015.01) | |
| *H04B 17/00* | (2015.01) | |
| *H04Q 1/20* | (2006.01) | |
| *H04W 24/08* | (2009.01) | |
| *H04N 21/426* | (2011.01) | |
| *H04N 21/61* | (2011.01) | |

(52) U.S. Cl.
CPC .............. *H04W 24/08* (2013.01); *H04B 3/46* (2013.01); *H04N 21/42676* (2013.01); *H04N 21/6118* (2013.01)

(58) Field of Classification Search
CPC . H04W 72/082; H04W 24/02; H04W 52/243; H04B 15/00; H04B 1/1063; H04B 1/71
See application file for complete search history.

(56) References Cited

U.S. PATENT DOCUMENTS

| | | | | |
|---|---|---|---|---|
| 6,748,021 B1* | 6/2004 | Daly | ..................... | H04L 1/0003 370/337 |
| 2003/0022645 A1* | 1/2003 | Runzo | ................ | H04B 17/0085 455/226.2 |
| 2003/0202537 A1* | 10/2003 | Rogerson | ............. | H03K 3/0315 370/478 |
| 2004/0048574 A1* | 3/2004 | Walker | ................. | H03K 3/0315 455/63.1 |

(Continued)

*Primary Examiner* — Shuwang Liu
*Assistant Examiner* — Sung Ahn
(74) *Attorney, Agent, or Firm* — Duft Bornsen & Fettig LLP; Gregory T. Fettig (57) ABSTRACT

Systems and methods presented herein provide for monitoring of noise and other interfering energy on a communication link. One system includes an interface coupled to the communication link to receive a signal conveyed over the communication link. The system also includes a monitor operable to: track energy across a frequency spectrum of the signal conveyed over the communication link for a predetermined period of time; flag, at intervals of the predetermined period of time, energy levels across the frequency spectrum of the signal that breach a threshold energy level to identify where in the frequency spectrum a breach of the threshold energy level occurs; and add the flags to determine how long the threshold energy level was breached during the predetermined period of time.

12 Claims, 10 Drawing Sheets

(56) References Cited

U.S. PATENT DOCUMENTS

| | | | |
|---|---|---|---|
| 2007/0058693 A1* | 3/2007 | Aytur | H04B 1/713 375/130 |
| 2008/0002606 A1* | 1/2008 | Cheung | H04W 24/00 370/328 |
| 2008/0069275 A1* | 3/2008 | Horiguchi | H04B 7/10 375/347 |
| 2008/0227478 A1* | 9/2008 | Greene | G06K 19/0701 455/522 |
| 2010/0026549 A1* | 2/2010 | Weissman | H04B 1/1027 342/17 |
| 2011/0128178 A1* | 6/2011 | Dafesh | H04K 3/228 342/17 |
| 2011/0172838 A1* | 7/2011 | Pai | G05B 15/02 700/292 |
| 2011/0280489 A1* | 11/2011 | Turpin | G01R 13/029 382/209 |
| 2013/0203458 A1* | 8/2013 | Charbit | H04W 52/34 455/522 |

* cited by examiner

ENERGY MONITORING IN A COMMUNCIATION LINK

CROSS REFERENCE TO RELATED APPLICATIONS

This patent application is a non-provisional patent application claiming priority to, and thus the benefit of an earlier filing date from, U.S. Provisional Patent Application Nos. 61/939,375 (filed Feb. 13, 2014) and 62/030,270 (filed Jul. 29, 2014), the entire contents of each of which are hereby incorporated by reference.

BACKGROUND

Noise is a problem in many communication schemes and comes in a variety of forms. For example, lightning, sparks, etc. can electromagnetically interfere with communication signals in the Radio Frequency (RF) spectrum. Short burst-like electromagnetic radiation can interfere with communication signals over a broad range of frequencies and is commonly referred to as impulsive noise. Other forms of noise include continuous wave (CW) electromagnetic radiation, such as that occurring with other communication signals located on the same RF. In any case, random noise is ever present and represents a basic challenge to communications engineers.

As communication techniques become more complex (e.g., to satisfy higher data consumption), communication signals can become more susceptible to noise. Accordingly, a variety of techniques have implemented to overcome the effects of noise. For example, transmission or reception of a signal through a directional antenna can make the desired signal stronger than others in the area. Filtering can also be used to isolate the signal from other signals in the spectrum. And, even error correction codes can be implemented with the signal and used to extract data from the signal upon reception when the signal quality is degraded by noise. Other methods of noise circumvention include physically identifying the source of the noise and rectifying its effects on the signal. However, none of these solutions provides a receiver with the ability to statistically document the noise on a signal such that any one or more of these solutions can be more effectively chosen and implemented.

SUMMARY

Systems and methods presented herein provide for monitoring noise and other interfering energy on a communication link. In one embodiment, a system includes an interface coupled to the communication link to receive a signal conveyed over the communication link. The system also includes a monitor operable to: track energy across a frequency spectrum of the signal conveyed over the communication link for a predetermined period of time; flag (e.g., identify), at intervals of the predetermined period of time, energy levels across the frequency spectrum of the signal that breached a threshold energy level, to identify where in the frequency spectrum a breach of the threshold energy level occurs; and add (e.g., accumulate) the flags to determine how long the threshold energy level was breached during the predetermined period of time. For example, all periods generally are "flagged" in that their energy values in Joules are measured and put into a histogram. Above a predetermined threshold may cause a signal recording.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
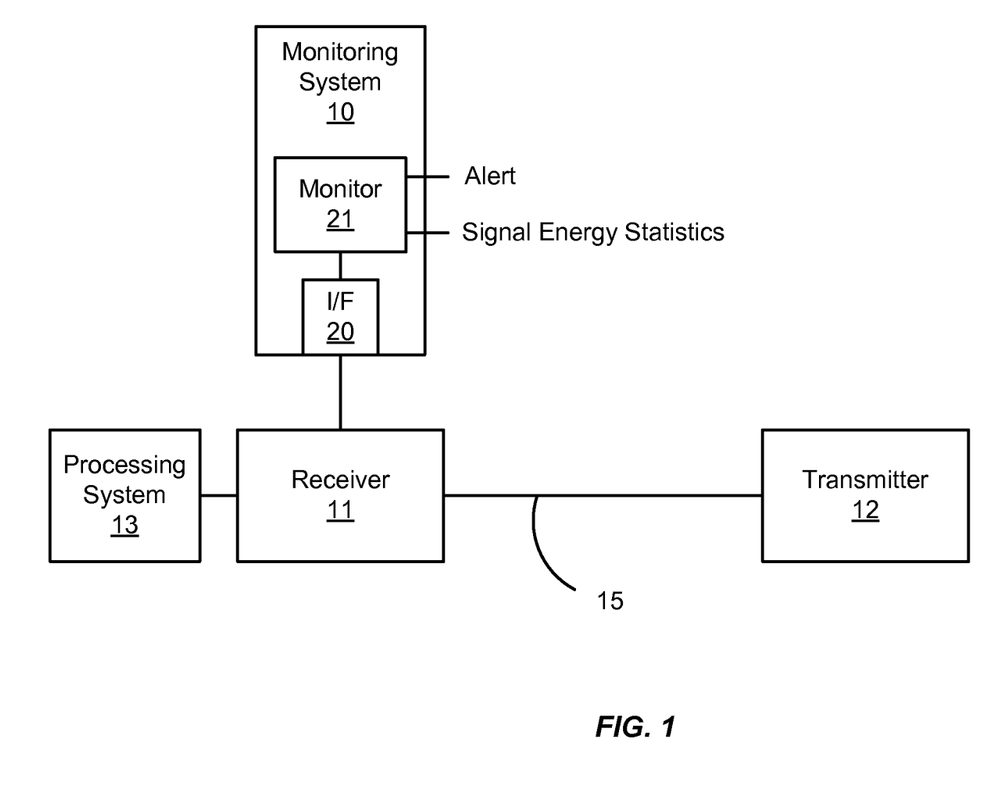
FIG. 1 is a block diagram of a communication system employing a monitoring system operable to monitor a receiving end of a communication link.

FIG. 1 is a block diagram of a communication system employing a monitoring system 10 configured with a monitor 21 operable to monitor a receiving end of a communication link 15. The communication system, in its simplest form, includes a transmitter 12, a receiver 11, and a processing system 11. The transmitter 12 conveys a signal to the receiver 11 over the communication link 15 where it is processed by the processing system 13 to extract information (e.g., data and/or voice) from the signal. Thus, the communication system illustrated herein may be representative of a variety of types of communication systems, including for example cellular telephony systems, cable television systems, etc.

The monitoring system 10 interfaces with the communication link 15 (i.e., via a signal interface 20 coupled to the receiver 11) and, via the monitor 21, monitors the signal conveyed over the communication link 15 and determines statistical properties of the signal including signal loading and interference energy (e.g., noise). For example, the communication link 15 may be an RF signal conveying one or more communication signals. When the communication signals conveyed over the RF signal increase the amount of energy being transferred, those communication signals may interfere with themselves, overpower the receiver 11, and/or be interfered with by noise or other signals. And, higher order modulation techniques employed amongst the communication signals may convey more data but are also less robust to noise. While filters and other noise remediation techniques may be employed by the communication system, the monitoring system 10 enhances the noise remediation by providing the receiver 11 with the ability to statistically identify interference along the communication link 15 such that changes to communication signals can be made (e.g., increase or decrease signal strength, decrease modulation scheme, increase forward error correction, etc.).

To illustrate, the communication link 15 may be an optical communication link employed by a cable television system. The processing system 13, in this regard, may include cable television headend equipment operable to process upstream traffic transmitted by the transmitter 12 to the receiver 11. Cable television systems now offer bundled services that include cable television, internet, and phone. The cable television traffic is considered downstream traffic and is typically converted from RF at the headend to an optical communication signal. The optical communication signal is then converted back to RF at fiber nodes of the cable television network where it can be distributed to set-top boxes (a.k.a. terminal equipment) of households, businesses, and the like. Upstream traffic is typically used to convey Internet data and Internet phone between a households/ businesses and the headend. This traffic is configured in one or more data signals that are transmitted via RF over a coaxial cable. The transmitter 12 receives the RF signal over the coaxial cable and converts it to an optical communication signal.

The upstream traffic combines the Internet communications (and other communications) of a plurality of households and businesses into an RF signal that is conveyed over a coaxial cable to a node. Each cable television network node may have hundreds or even thousands of "drops" or "taps" with each tap providing a bi-directional communication link between a household/business to the headend. The cable television network node combines the communications from the taps for transmission upstream to the headend. The node converts the RF upstream signal into an optical communication signal where it is conveyed to the headend (e.g., by the transmitter 12 over the communication link 15). The RF signal from the node may occupy a substantial amount of bandwidth (e.g., 5 MHz to 42 MHz amongst others) to convey multiple data signals over the optical communication signal.

As the upstream traffic is a combination of signals from multiple taps, signal loading can fluctuate. For example, people access the Internet with different data requirements (e.g., web traffic, streaming video, streaming audio, etc.) all throughout the day. Thus, there is no consistent amount of data being conveyed between the node and the headend. The signal conveying the Internet traffic therefore can fluctuate in terms of power and bandwidth. This fluctuating signal in the upstream traffic can overdrive the optical converter at the transmitter 12 causing data to be lost at the receiver 11 because, for example, the laser generating the optical signal can be overdriven or "clipped" by the energy fluctuating signal. For example, the amount of power is generally controlled to prevent overloading; but sometimes control is lost for various reasons or additive noise energy causes clipping of the laser.

Further complicating the overdriven optical converter concept includes the introduction of noise into the system. Certain electromagnetic events can generate noise that affects the RF signal conveyed to the cable television network node. When the node converts the RF signal to an optical signal to be transmitted over the communication link 15, the noise can also overdrive the opto-electrical converter of the transmitter 12 again causing data to be lost in the receiver 11.

As mentioned, noise can come from a variety of sources. Broadband impulsive noise, which may affect a substantial portion of the RF signal, results from short burst-like electromagnetic radiation. Other continuous wave noise may come in the form of other signals interfering in the same frequency as the desired signal. The coaxial cables that convey the RF signals from the taps to the nodes in cable television networks are shielded so as to prevent noise from interfering with the RF signals. However, noise can still find its way into the coaxial cables. For example, a household with old or improper coaxial wiring may introduce noise into the coaxial cable through common grounding of the coaxial cable's shielding and the electrical wiring of the household. Noise may also be introduced when a coaxial cable is improperly shielded or worn (e.g., cracked, frayed, animal chewed, etc.).

In any case, the monitoring system 10 provides statistical analysis of the communication link 15 that allows a receiving end of the upstream traffic to identify the types and effects of noise being introduced to the signal. In this regard, the monitoring system 10 is any device, system, software, or combination thereof operable to monitor the communication link 15 and analyze the effects and types of noise on the signal(s) being conveyed over the communication link 15. The monitoring system 10 may also provide an alert to the receiver 11 (or any operational support systems) when the noise has a deleterious effect on the signal(s) being conveyed over the communication link 15. Of course, the invention is not intended to be limited to any type of communication link as the monitoring system 10 could be used on downstream signals as well.

Figure 2:
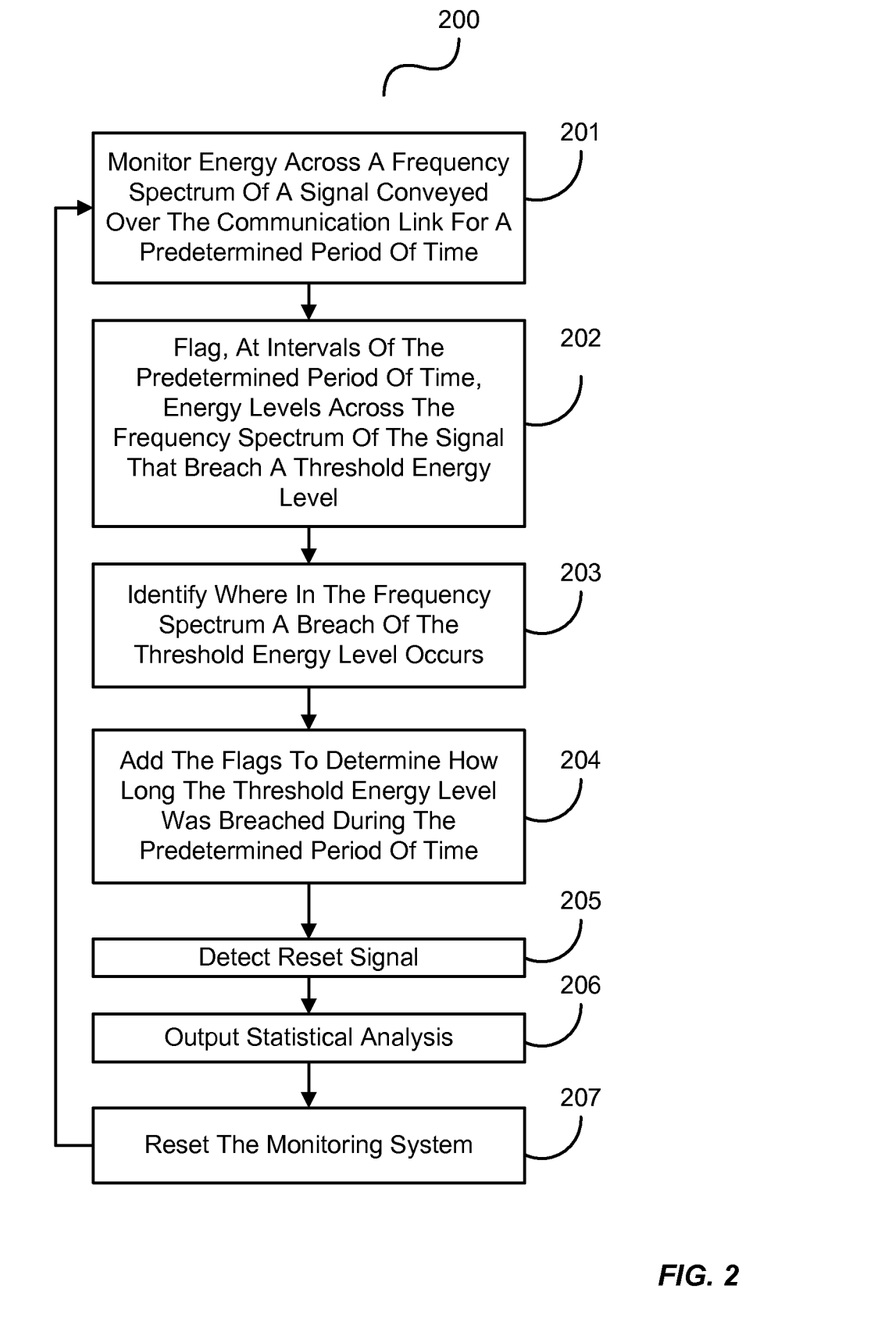
FIG. 2 is a flowchart of an exemplary process operable with the monitoring system of FIG. 1.

FIG. 2 is a flowchart of an exemplary process 200 operable with the monitoring system 10. In this embodiment, the monitoring system 10 monitors energy across a frequency spectrum of the signal conveyed over the communication link 15 for a predetermined period of time, in the process element 201. The monitoring system 10 flags, at intervals of the predetermined time (or continuously), energy levels across the frequency spectrum of the signal, in the process element 202. And, since the monitoring system 10 is monitoring the frequency spectrum of the signal, the monitoring system 10 is also operable to identify where in the frequency spectrum that a breach of the threshold energy level occurs, in the process element 203.

The monitoring system adds the flags to determine how long the threshold energy level is breached during a predetermined period of time, in the process element 204. For example, suppose the predetermined time of monitoring is 40,000 µs and, during that window of time, the monitoring system 10 compares the energy of the RF spectrum of the signal to a threshold energy level 1000 times during that window (i.e., a sample interval of 40 µs). The monitoring system 10 may generate a flag at each location in the RF spectrum of the signal at each 40 µs interval where the energy level of the signal exceeds the threshold energy level.

The monitoring system 10 then counts the number of flags at each location in the frequency spectrum of the RF signal to determine the duration of the energy level. If the energy level at a particular frequency range exceeds the threshold energy level for all ten intervals during the predetermined time (i.e., 40 μs), then the energy fluctuation may possibly be attributed to continuous wave noise that can be filtered out. However, if the energy level at that frequency range exceeds the threshold energy level for a single time interval across the RF spectrum of the signal, then then the energy fluctuation may be attributed to burst noise.

At the end of the predetermined period of time, the monitoring system 10 detects a reset signal, in the process element 205. The processor may store the data in response to the reset signal and format the data into graphs and other plotting methods based on statistical analysis that assist a user with identifying the type and source of the noise, in the process element 206. The processor then directs the monitoring system 10 to reset, in the process element 207, such that it may acquire additional data, in essence resetting the integration of power process. Additional details regarding the monitoring system 10 and its outputs are shown and described below.

Figure 3A:
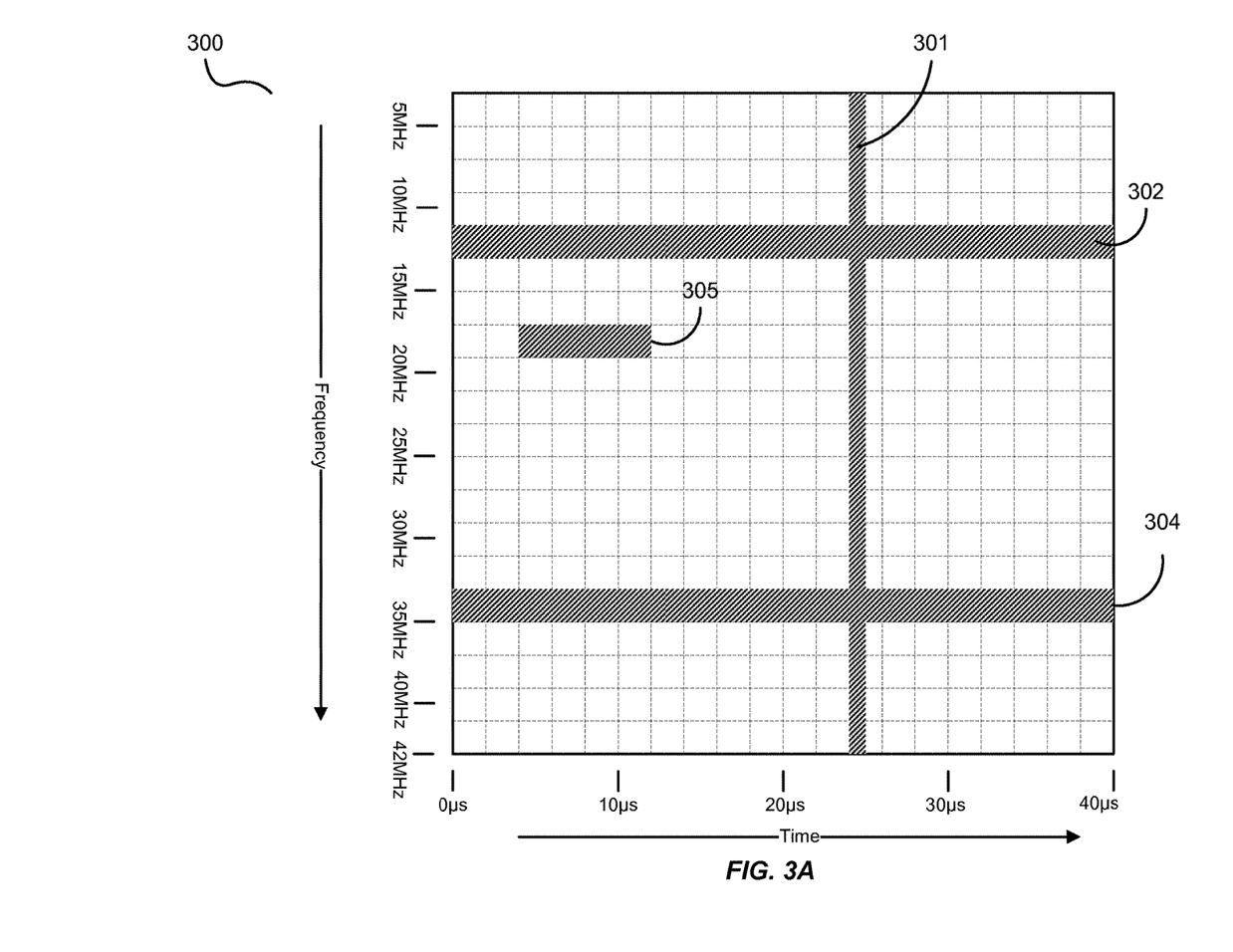
FIGS. 3A-3C are exemplary traffic and impairment diagrams measured by the monitoring system of FIG. 1.
Figure 3B:
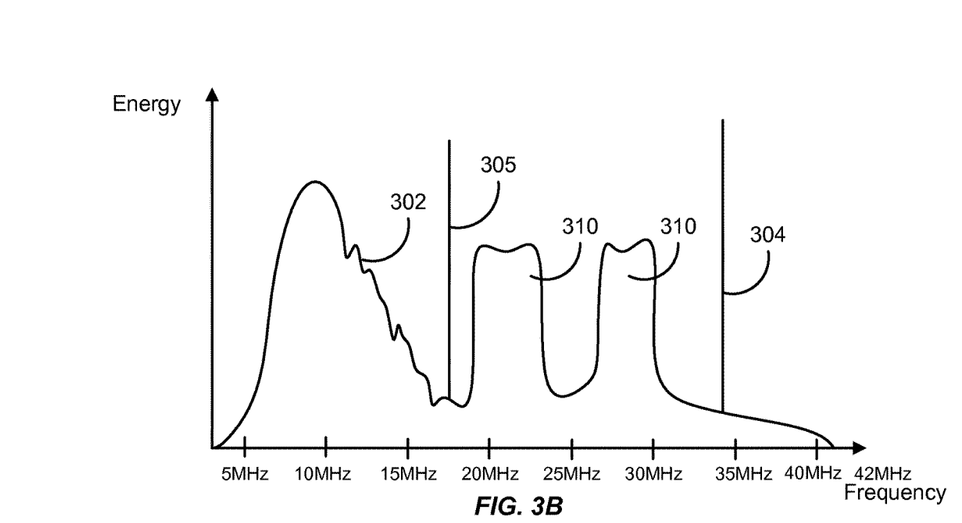
Figure 3C:
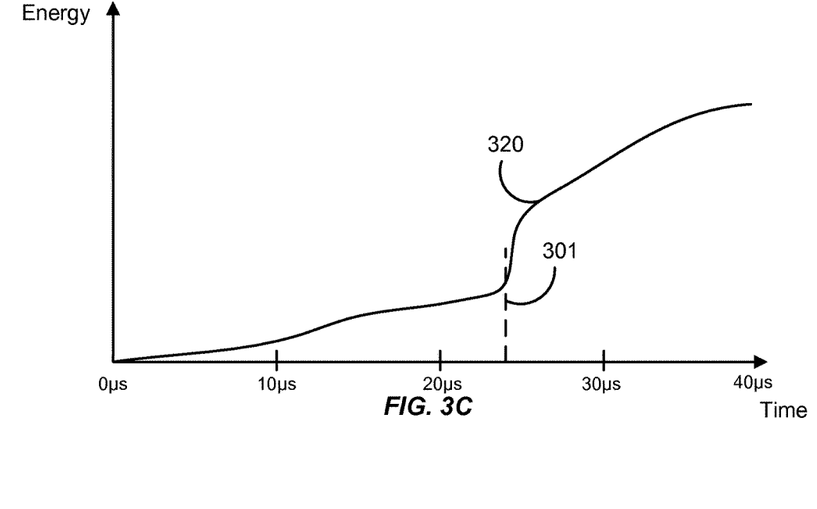

FIGS. 3A-3C are exemplary traffic and impairment diagrams generated by the monitoring system 10. More specifically, FIG. 3A illustrates a frequency versus time diagram 300 of the energy contained in the signal conveyed over the communication link 15 (e.g., a "waterfall" display). FIG. 3B is an energy versus frequency diagram of the diagram in FIG. 3A and FIG. 3C is an energy versus time diagram of the diagram in FIG. 3A. In this embodiment, the monitoring system 10 monitors the signal for a period of 40 μs over a predetermined frequency bandwidth of roughly 42 MHz, a common frequency range for upstream cable television traffic. However, those skilled in the art should readily recognize that the inventive aspects herein are not intended to be limited to any particular frequency spectrum or communication system. Additionally, those skilled in the art should readily recognize that the period of time and the intervals in which the monitoring system 10 monitors the signal may be selected as a matter of design choice and/or to match a modulation type such as CDMA or OFDM(A).

As the monitoring system 10 interfaces with the communication link 15 and begins monitoring the signal therein, the monitoring system 10 tracks energy across the frequency spectrum of the signal and determines the energy in the band for the time period, yielding a Joule value. For example, each of the frequency versus time blocks inside the diagram 300 has a certain energy level that is integrated by the monitoring system 10. The shaded blocks in the diagram 300 illustrate where noise and/or other signals achiever some energy level of the monitoring system 10 over time. The shaded blocks 302 illustrate a noise that is common with the lower end of this RF spectrum, as similarly illustrated in FIG. 3B.

The shaded blocks 304 illustrate a continuous wave type of interference around the 34 MHz range. In this instance, the interference 300 is in the form of a continuous wave signal that may interfere with the desired communication signals 310 conveyed over the RF spectrum, which is also illustrated in FIG. 3B. The shaded blocks 305 illustrate a form of continuous wave interference lasting for about 8 μs around 18 MHz, which is also illustrated in FIG. 3B.

The shaded blocks 301 illustrate a short duration interference, such as that caused by burst electromagnetic radiation. The monitoring system 10 is operable to detect such noise and other signal waveforms and illustrate its effects via a power versus time format as illustrated in FIG. 3C. The monitoring system 10 is also operable to compute joule values for these signals. For example, the frequency bandwidth of impulsive noise is roughly 1/(pulse width). So, a relatively long 1 μs impulse of electromagnetic radiation can occupy roughly 1 MHz of bandwidth. And, a much shorter burst of electromagnetic radiation, such as 1 ns, can affect anything larger bandwidth even completely enveloping the desired frequency range. Depending on the energy level, the burst noise can have a deleterious effect on communication signals, particularly those with high modulation order modulation schemes such as 4096 Quadrature Amplitude Modulation (QAM) and 1024 QAM Orthogonal Frequency Division Multiplexing (OFDM).

The monitoring system 10 is operable to illustrate the effects of burst noise as well as other types of noise over time. FIG. 3C illustrates the time plot of the various signal energies in the selected bandwidth of diagram 300 of FIG. 3A. For example, the relatively short burst of electromagnetic energy 301 detected by the monitoring system 10 around 25 μs. The monitoring system 10 also accumulates (integrates) the energy over a predetermined period of time (e.g., based on a number of samples in storage capabilities). With each of these plots, monitoring system 10 can provide a three-dimensional analysis of signal degradation so as to better identify energy fluctuations and/or impairment in a signal conveyed over the communication link 15.

Figure 4:
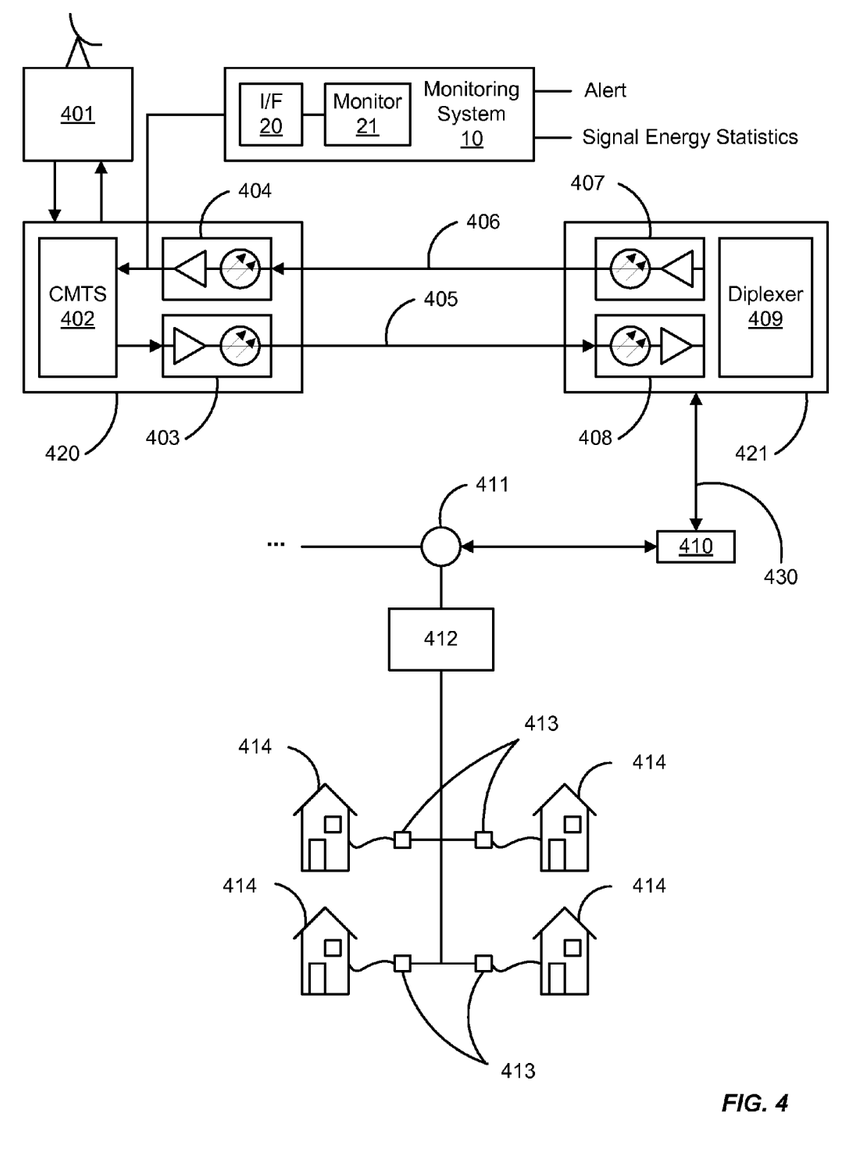
FIG. 4 is a block diagram of an exemplary communication system employing the monitoring system of FIG. 1.

FIG. 4 is a block diagram of an exemplary communication system employing the monitoring system of 10. More specifically, the monitoring system 10 in this embodiment is implemented with an upstream link of a cable television communication system with high speed data services being delivered over devices conforming to the Data Over Cable Service Interface Specification (DOCSIS) specification. The communication system includes a headend 401 configured with an upstream hub 420. The hub 420 is coupled to a fiber node 421 via optical communication links 405 and 406. The hub 420 includes a Cable Modem Termination System (CMTS) 402, an electrical to optical converter 403, and an optical to electrical converter 404. The node 421 is similarly configured with an optical to electrical converter 408 and an electrical to optical converter 407.

The headend 401 is the source for various television signals. Antennas may receive television signals that are converted as necessary and transmitted over fiber optic cables 405 to the hub 420. Several hubs may be connected to a single headend 401 and the hub 420 may each be connected to several nodes 421 by fiber optic cable links 405 and 406. The CMTS 402 may be configured in the headend 401 or in the hub 420.

Downstream, in homes/businesses are devices and data terminals such as the Cable Modems (CM; not shown). A CM acts as a host for an Internet Protocol (IP) device such as personal computer. Transmissions from the CMTS 402 to the CM are carried over the downstream portion of the cable television communication system generally in the band between 54 and 860 MHz. Downstream digital transmissions are continuous and are typically monitored by many CMs. Upstream transmissions from the CMs to the CMTS 402 are typically carried in the 5-42 MHz frequency band, the upstream bandwidth being shared by the CMs that are on-line. However, with greater demands for data, additional frequency bands and bandwidths are continuously being deployed in the downstream and upstream paths.

The CMTS 402 connects the local CM network to the Internet backbone. The CMTS 402 connects to the downstream path through an electrical to optical converter 404 that is connected to the fiber optic cable 406, which in turn, is connected to an optical to electrical converter 408 at the node 421. The signal is transmitted to a diplexer 409 that combines the upstream and downstream signals onto a single cable. The diplexer 409 allows the different frequency bands to be combined onto the same cable. The downstream channel width in the United States is generally 6 megahertz with the downstream signals being transmitted in the 54 to 860 MHz band. Upstream signals are presently transmitted between 5 and 42 MHz, but again other bands are being considered to provide increased capacity.

After the downstream signal leaves the node 421, the signal is typically carried by a coaxial cable 430. At various stages, a power inserter 410 may be used to power the coaxial line equipment, such as amplifiers or other equipment. The signal may be split with a splitter 411 to branch the signal. Further, at various locations, bi-directional amplifiers 412 may boost and even split the signal. Taps 413 along branches provide connections to subscriber's homes 414 and businesses.

Upstream transmissions from subscribers to the hub 420/headend 401 occur by passing through the same coaxial cable 430 as the downstream signals, in the opposite direction on a different frequency band. The upstream signals are sent typically utilizing Quadrature Amplitude Modulation (QAM) with forward error correction. The upstream signals can employ QPSK or any level of QAM, including 8 QAM, 32 QAM, 64 QAM, 128 QAM, and 256 QAM. Modulation techniques such as Synchronous Code Division Multiple Access (S-CDMA) and Orthogonal Frequency Division Multiple Access (OFDMA) can also be used. Of course, any type of modulation technique can be used, as desired. In DOSCIS 3.1, OFDM modulation will be used on the downstream band of the coaxial cable and OFDMA will be used on the upstream band of the coaxial cable.

Upstream transmissions, in this embodiment, are typically sent in a frequency/time division multiplexing access (FDMA/TDMA) scheme, as specified in the DOCSIS standards. The diplexer 409 splits the lower frequency signals from the higher frequency signals so that the lower frequency, upstream signals can be applied to the electrical to optical converter 407 in the upstream path. The electrical to optical converter 407 converts the upstream electrical signals to light waves which are sent through fiber optic cable 405 and received by optical to electrical converter 403 in the node 420.

Many cable impairments come from the coaxial portion of the cable television communication system. While the downstream cable plant is relatively free of severe impairments, the upstream plant can be afflicted with a variety of impairments. This is because the coaxial cable plant is a linear system that uses a tree and branch architecture. The downstream signals are split yielding many copies of a relatively good signal. The upstream signals, however, are combined, giving any noise source in any home an opportunity to create interference for the transmissions from any and all homes, and additive noise effect called "noise-funneling".

Upstream cable impairments are generally most severe in the 5-15 MHz portion of the 5-42 MHz return band. Shielding breaks in the coaxial cable, particularly inside homes, give many noise sources an opportunity to ingress into the upstream signal path. The sources of interference may include broadcast signals, such as radio stations, citizen band radios, and ham radios. Short duration broadband interferences may include lightning, static electricity discharges, and interference from the AC power grid. Interference associated with the power grid in the form of burst noise can have a particularly deleterious effect on upstream signals. The interference may be created by switching or operating loads, appliances with motors using brushes, lighting, etc.

Another cable impairment is called common path distortion (CPD). This impairment is created by downstream signals in the 54-860 MHz band creating non-linear distortion in the upstream frequency band. Impairments can be made worse by the lack of continuous calibrated signal sources from remote points. For example, a forward path uses an output of the headend 401 as a continuous reference signal for gain, frequency response, and noise, but the return upstream path has no such reference. This contributes to alignment problems. Additionally, there is difficulty in determining the entry point of ingress in the upstream path. This is especially difficult when the noise is short duration, or transient in nature, such as burst noise.

Although the fiber optic portion (405) of the upstream path is relatively immune to impairments, solid state lasers in the fiber optic link 405 can be affected by burst noise. If the burst noise located in the 5-15 MHz portion of the band is strong enough, it can temporarily extinguish (i.e., clip) the laser. This means that the laser stops producing coherent light and transmissions in all frequency bands including those outside the 5-15 MHz band can be affected.

The fiber optic links 405 and 406 are typically driven by laser diodes, such as Fabry Perot and distributed feedback laser diodes. Laser diodes begin to "lase" at a certain diode threshold current. Below the threshold current, the laser turns off and causes abrupt clipping of any signal being carried by the laser. At a saturation current, the light output of the laser diode becomes non-linear, causing abrupt clipping to occur. Thus, the clipping that occurs both below the threshold current level and above the saturation current level introduces distortion into the optical signal.

In addition to laser clipping, another source of upstream impairment is ingress or burst noise and broadcast noise. For instance, if a transmission is made at 30 MHz and the system receives a relatively large burst of noise between 5 and 10 MHz, the laser output may be clipped from the extra energy of the electromagnetic radiation. Burst noise at lower frequencies can still cause the laser to create an impairment called cross-compression or cross-modulation. This impairment is generally non-linear caused by overloaded amplifiers and clipped lasers. Cross compression noise is a third-order distortion that generally that affects all frequencies.

Burst noise energy has also been known to compress upstream active devices. Most of the energy that causes the compression is typically in the 5-15 MHz band, but signals at all other frequencies are affected by cross-compression. This phenomenon is especially noticeable on systems using Fabry-Perot lasers, which have limited dynamic range. Much upstream impairment is caused by laser clipping where the energy causing the clipping may not in the same band as the affected carriers.

Forward Error Correction (FEC), such as Reed-Solomon error correction, on upstream signals can be employed to protect the data from burst noise and other transmission errors. The DOCSIS specification discloses the use of FEC codes using Reed-Solomon linear block codes in the upstream path. However, this has an effect on the amount of data that can be transmitted. For example, error correction generally includes extra bits of data to correct degraded data at the receiving end. Thus, when more bits are used to correct errors at one data rate, fewer bits are used to actually convey the data. And, if burst noise is too severe, the Forward error correction may not be sufficient to correct all of the corrupt data, causing entire FEC block transmissions to fail.

The monitoring system 10 is operable to assist in the remediation of noise and other interfering energy by alerting the user when laser clipping occurs. The monitoring system 10 is also operable to provide statistics regarding the noise and interfering energy of the signal so as to assist in identifying the source(s) of the noise/interfering energy. The monitoring system 10 is configured to interface with the hub 420 (via the interface 20 which may be an analog-to-digital converter) to monitor (via the monitor 21) laser clipping at the node 421 due to noise and/or excessive signal loading by the taps 413 (e.g., due to many households 414 interacting with the Internet at the same time). The monitoring system 10 in this embodiment is operable to alert the operational support system when the RF signal from the optical to electrical converter 403 is being degraded due to laser clipping of the signal conveyed over the optical communication link 405 by the clipped laser in the electrical to optical converter 407. A more detailed example of such alerting and noise analysis is illustrated in greater detail below in FIGS. 5-8.

Figure 5:
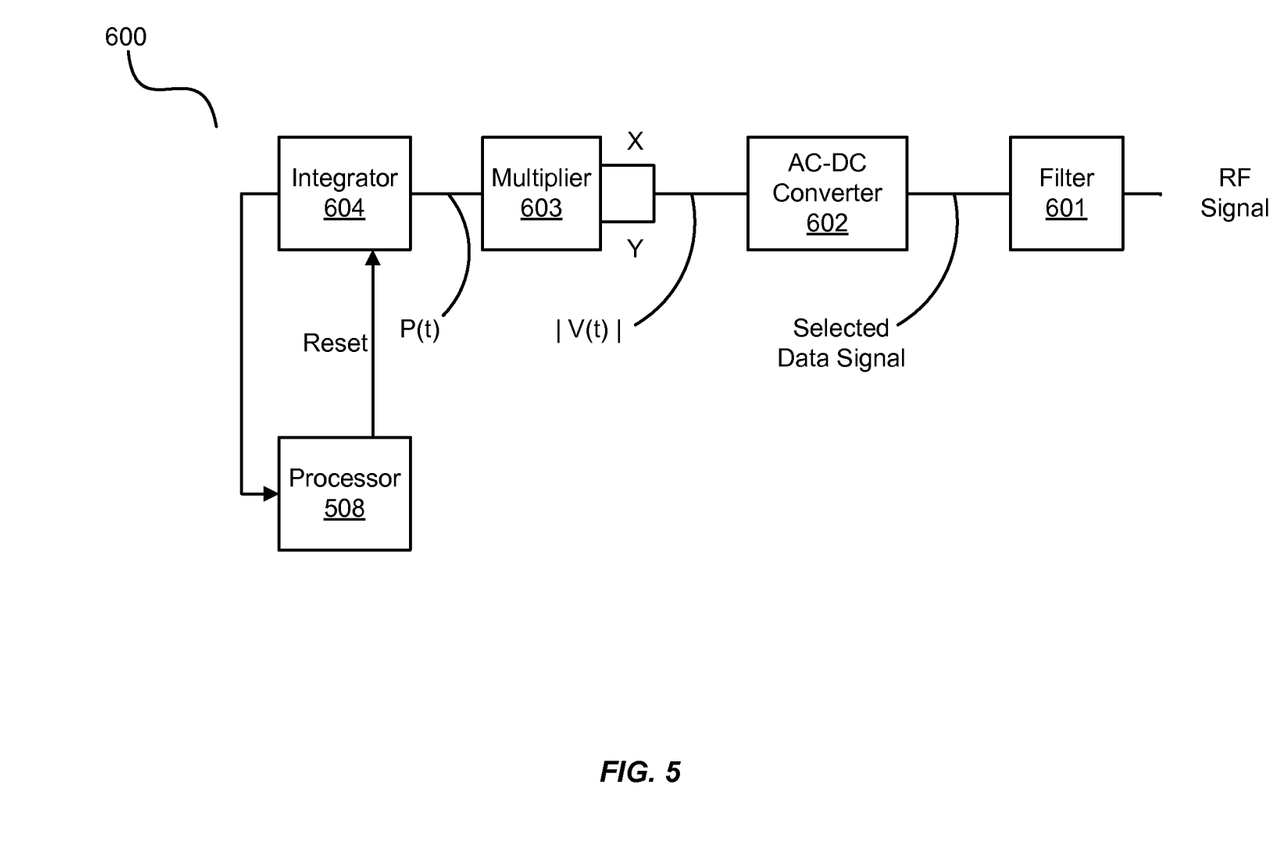
FIG. 5 is a block diagram of an exemplary energy fluctuation detector of the monitoring system of FIG. 1.

FIG. 5 is a block diagram of an exemplary energy fluctuation detector 600 (e.g., a radiometer, a device for measuring the radiant flux, or power, of electromagnetic radiation) of the monitoring system 10. The detector 600 is operable to obtain energy values (e.g., in Joules) for individual data channels/data signals or noise energy in the RF signal. The detector 600 receives the upstream RF signal as converted by the optical to electrical converter 403 in the hub 404 and filters off frequencies surrounding the desired data signal via the filter 601. For example, the data signal for which reception is desired by the hub 420 is located at a frequency with a bandwidth and modulation scheme known to the hub 420. The filter 601 is therefore designed to isolate that data signal such that the CMTS 402 can demodulate the signal and extract the data therefrom.

Once filtered, the selected data or noise signal is then passed through an AC to DC converter for which outputs a time varying DC voltage signal V(t). The voltage signal V(t) is squared with a multiplier 603 so as to generate a time varying power signal P(t). An integrator 604 is then used to integrate the power signal P(t) such that the power of the selected data signal can be accumulated (integrated) over time and presented to the user of the monitoring system 10 in the form of a Joule plot with a final Joule integrand value 650 as exemplarily illustrated in FIG. 6.

Figure 6:
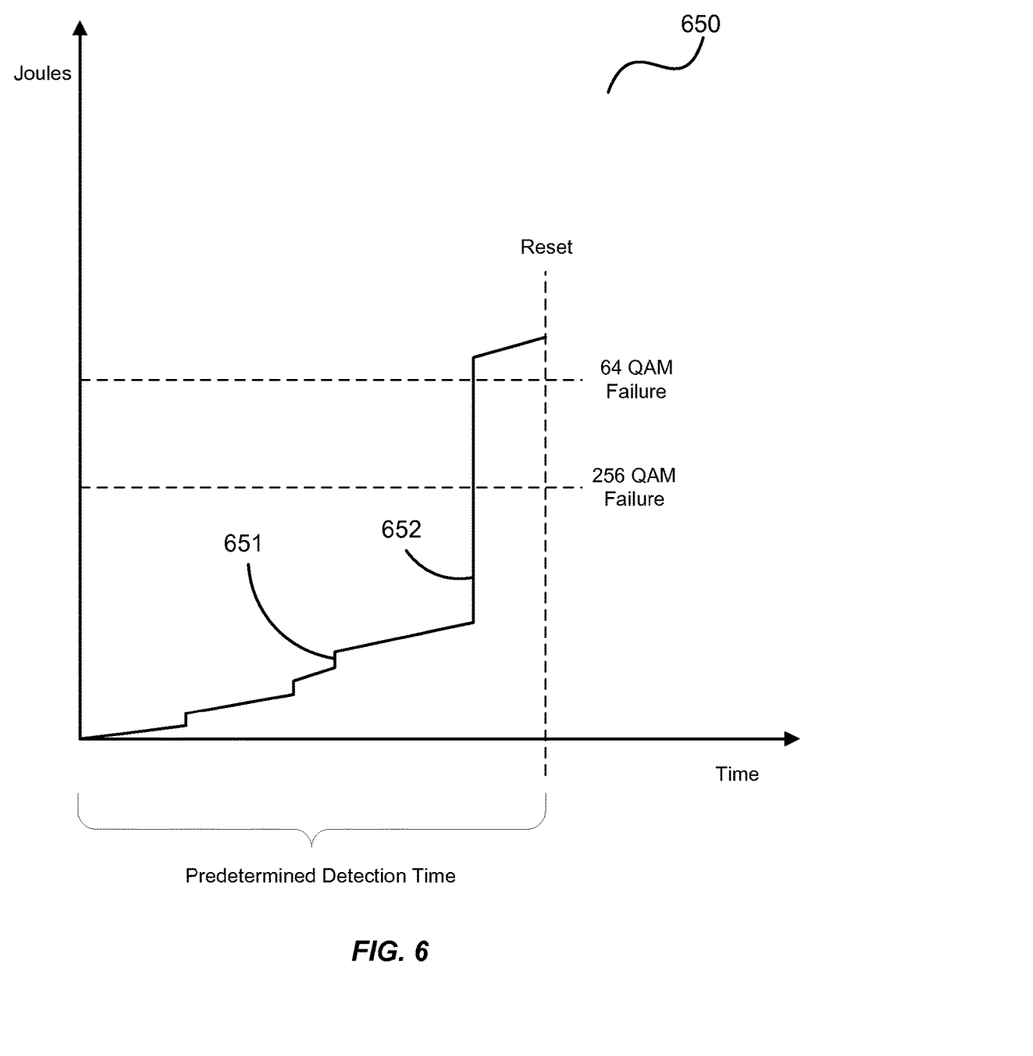
FIG. 6 is an exemplary energy vs. time graph of a signal monitored by the energy fluctuation detector of FIG. 6.

As noise of the signal can contribute to the power fluctuations in the RF signal, that power is also accumulated with the power of the data signal. For example, the detector 600 monitors the power of the data signal for a predetermined period of time (e.g., 40 µs). Assuming that the data signal has a relatively constant power and noise power is relatively constant as well, there is a gradual increase in the accumulated random energy over the predetermined period of time. However, when noise interferes with and adds to the overall energy in the signal, the integrator 604 accumulates this energy which is reflected with plot 650 during the predetermined period of time. The steps in a plot 650 represent significant increases in the overall energy of the spectrum that are likely attributed to burst noise.

As mentioned, certain data signals may be more susceptible to noise/interfering energy than other data signals. And, the effects of this noise/interfering energy on the signals may be already known. Accordingly, the histogram may reflect when certain signals, such as 256 QAM and 64 QAM, fail with the introduction of this accumulated noise/interfering energy. The detector 600 can therefore recommend, to a user of the monitoring system 10, signaling schemes and/or error correction schemes in the upstream data path based on the interfering energy. For example, if the detector 600 determines that the noise energy in the RF signal will cause a 256 QAM signal to fail, a user may direct the node 421 to switch to a 64 QAM signal or increase its error correction scheme to overcome the noise.

The detector 600 may be communicatively coupled to the processor 508 such that a processor 508 can acquire the data from the integrator 604 to generate the histogram 650. After each predetermined period of time, the processor 508 may then reset the integrator 604 such that another sample of data can be acquired.

Figure 7:
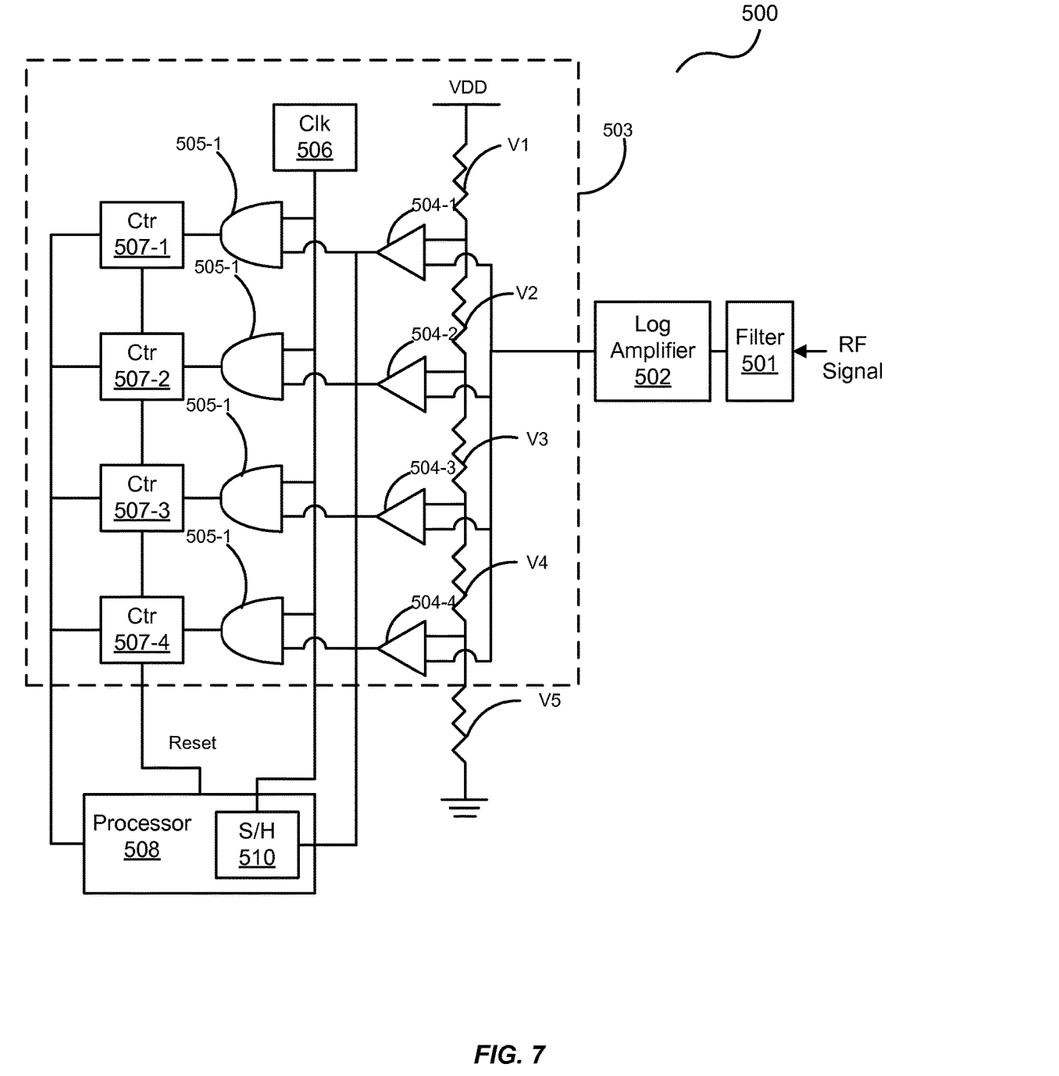
FIG. 7 is a block diagram of an exemplary alert module of the monitoring system of FIG. 1.

FIG. 7 is a block diagram of an exemplary alert module 500 of the monitoring system 10. The alert module 500 includes a log amplifier 502 operable to receive the RF signal converted by the optical to electrical converter 403 to generate an output signal having a DC voltage that is proportional to the log of the RF input signal. The output signal is then transferred to a bank of high-speed comparators 504-1-504-4, gates 505-1-505-4, counters 507-1-507-4 (an accumulator 503). The comparators 504-1-504-4 output logical "1s", or "flags", when a predetermined threshold voltage level V1-V4 is exceeded. These logical 1 outputs are then accumulated by the counters 507-1-507-4. For example, if an output from a comparator 504 is a logical "1", a high speed clock 506 (e.g., 50 MHz) increments a totalizing counter through a corresponding AND gate 505. Thus, assuming a 50 MHz clock at the end of 1 second, a counter 507 having a count of 25e6 would indicate that the threshold voltage level VDD had been exceeded half of the time. At the end of the predetermined count period (i.e., one second in this example), the totals of the counters 507 are then loaded into a processor 508 such that they may be formatted into a displayable output and/or some other form of alert (e.g., an alarm). Afterwards, the processor 508 may reset the counters 507-1-507-4 such that another set of samples may be obtained from the RF signal. Alternatively or additionally, the alert module 500 simply gathers statistics for subsequent analysis.

In one embodiment, a filter 501 is configured with the alert module 500 to remove certain upstream portions of the RF signal. For example, if a user wishes to simply identify signal loading of a particular data signal combining traffic from a plurality of the taps 413, the filter 501 may be configured to isolate that data signal such that the alert module 500 can identify when and how long that data signal is exceeding desired energy levels. That is, the filter 501 may allow the alert module 500 to determine whether signal loading of the data signal is causing the laser of the electrical to optical converter 407 to clip. An example of such is illustrated in FIG. 6.

Figure 8:
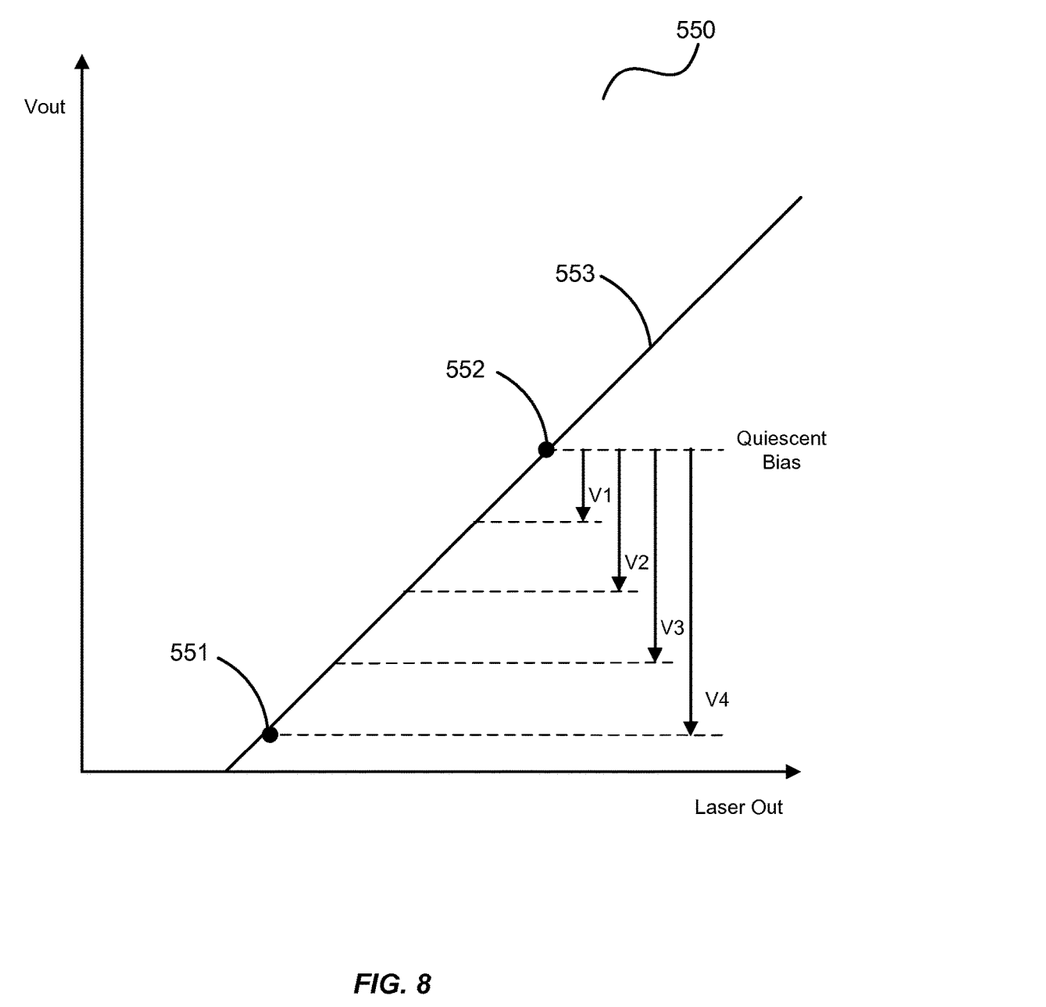
FIG. 8 is an exemplary graph of voltage thresholds of a signal monitored by the alert module of FIG. 7.

FIG. 8 is an exemplary graph 550 of the energy of the RF signal monitored by the alert module 500. This figure illustrates one possible selection of voltages V1-V4 if the "clip point" is determined by a laser. The graph 550 illustrates a "curve" 553 of the laser light along the optical communication link 405 via the output voltage of the signal from the optical to electrical converters 403 versus the laser input current, as driven by the AC-coupled upstream RF input to the node 421. In this embodiment, the filter 501 is employed such that the graph 550 illustrates how increased loading in the data signal can cause clipping of the optical signal. For example, the filter 501 isolates the data signal in the RF signal of the coaxial cable 430. Increasing voltage of the RF signal is illustrated in the downward direction on the vertical axis. A quiescent bias voltage is determined at point 552 for the data signal where there is no loading. The voltage V1 may therefore represent the data signal as 25% loaded, V2 may represent the data signal as 50% loaded, V3 may represent the data signal as 75% loaded, and V4 may represent the data signal as 100% loaded, a point 551 at which laser clipping may initiate.

With this graph 550 in hand, the CMTS 402 may be queried as to how much data was transmitted upstream to thereby yield legitimate upstream utilization information. The CMTS 402 could also be configured to inhibit the counters 507 while legitimate traffic is arriving, thereby allowing the graph 550 to illustrate how noise affected the upstream data signal. In any case, the alert module 500 is operable to alert the CMTS 402 as to any conditions that may cause laser clipping in the upstream data signal.

Also illustrated with the alert module 500 is a sample and hold circuit 510 that is operable to generate instantaneous plots of signal power vs. time. For example, the sample and hold circuit 510 may sample each comparator 504 output during each clock cycle to determine the power of the RF signal at each clock cycle.

It should be noted that the invention is not intended to be limited to any particular number of comparators 504, AND gates 505, and counters 507 as such may be selected as a matter of design choice. For example, if the number of comparators 504, AND gates 505, and counters 507 were doubled, then the alert module 500 could be configured to determine signal loading at increments of 12.5%. Additionally, the monitoring system 10 is not intended to be limited to merely monitoring an upstream data path. The monitoring system 10 can also be implemented with the downstream data path (e.g., to receive the signal from the optical to electrical converter 408 at the node 421). However, as mentioned, the downstream data paths in a cable television communication system are generally not encumbered with the noise and other interfering energy associated with the upstream data paths. Voltage thresholds may be chosen as desired and not just limited to uniform log on linear scales.

Figure 9:
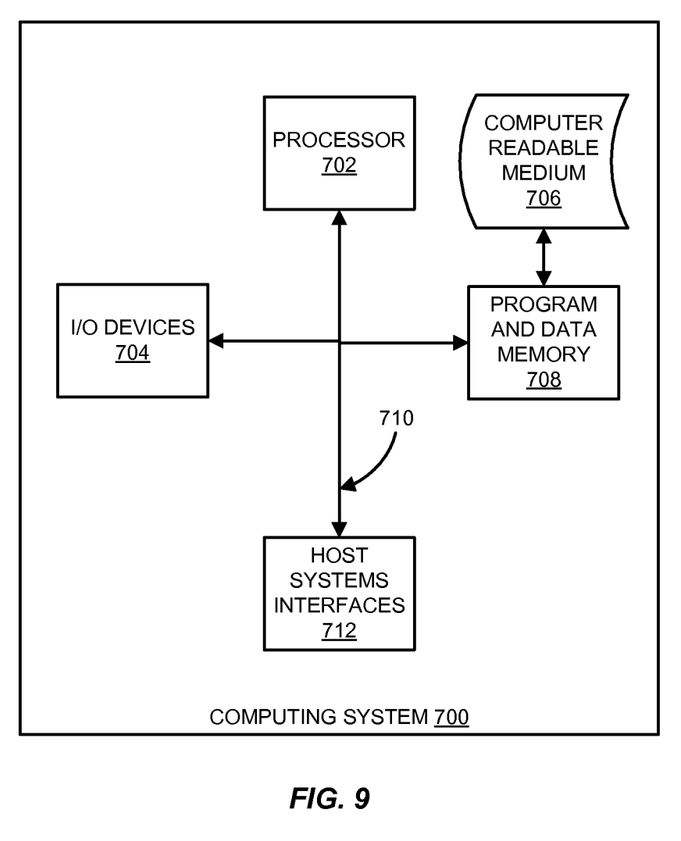
FIG. 9 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 9 illustrates a computing system 700 in which a computer readable medium 706 may provide instructions for performing any of the methods disclosed herein.

Furthermore, the invention can take the form of a computer program product accessible from the computer readable medium 706 providing program code for use by or in connection with a computer or any instruction execution system. For the purposes of this description, the computer readable medium 706 can be any apparatus that can tangibly store the program for use by or in connection with the instruction execution system, apparatus, or device, including the computer system 700.

The medium 706 can be any tangible electronic, magnetic, optical, electromagnetic, infrared, or semiconductor system (or apparatus or device). Examples of a computer readable medium 706 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 700, suitable for storing and/or executing program code, can include one or more processors 702 coupled directly or indirectly to memory 708 through a system bus 710. The memory 708 can include local memory employed during actual execution of the program code, bulk storage, and cache memories which provide temporary storage of at least some program code in order to reduce the number of times code is retrieved from bulk storage during execution. Input/output or I/O devices 704 (including but not limited to keyboards, displays, pointing devices, etc.) can be coupled to the system either directly or through intervening I/O controllers. Network adapters may also be coupled to the system to enable the computing system 700 to become coupled to other data processing systems, such as through host systems interfaces 712, or remote printers or storage devices through intervening private or public networks. Modems, cable modem and Ethernet cards are just a few of the currently available types of network adapters.

What is claimed is:

1. A cable television communication system operable to monitor a communication link in the system, the system comprising:
   an interface of a Cable Modem Termination System (CMTS) coupled to the communication link to receive a signal conveyed over the communication link; and
   a monitor operable to:
   track energy across a frequency spectrum of the signal conveyed over the communication link for a predetermined period of time;
   flag, at intervals of the predetermined period of time, energy levels across the frequency spectrum of the signal that breach a threshold energy level to identify where in the frequency spectrum a breach of the threshold energy level occurs; and
   add the flags to determine how long the threshold energy level was breached during the predetermined period of time,
   wherein:
   the communication link is an opto-electrical communication link;
   the signal is an optical communication signal conveying a digitized upstream Radio Frequency (RF) signal of the cable television communication system, and
   the monitor is further operable to direct a node of the cable television communication system to change a modulation scheme of the RF signal to overcome interfering energy in the signal.

2. The system of claim 1, wherein:
   the monitor is operable to generate a grid plot of the energy of the signal in a frequency-versus-time format for the predetermined period of time.

3. The system of claim 1, further comprising:
   a processor operable to reset the monitor, and to direct the monitor to monitor the communication link for another predetermined period of time.

4. The system of claim 1, wherein the monitor comprises:
   an amplifier operable to output a Direct Current (DC) signal having a voltage proportional to a voltage of the signal conveyed over the communication link; and
   an accumulator operable to track the voltage of the DC signal for the predetermined period of time, to generate a flag at discrete voltage levels when the voltage of the DC signal breaches each discrete voltage level, and to add each flag at each discrete voltage level to determine how long each discrete voltage level was breached during the predetermined period of time.

5. The system of claim 1, wherein:
the monitor comprises a detector operable to accumulate an amount of the interfering energy in the signal, and to recommend an error correction scheme that will be effective given the amount of the interfering energy in the signal.

6. The system of claim 1, further comprising:
a detector operable to accumulate an amount of the interfering energy in the signal, wherein the detector comprises:
   a filter operable to isolate a data signal in the signal conveyed over the communication link;
   an Alternating Current to Direct Current (AC-DC) converter operable to generate a time varying DC signal from the filtered data signal;
   a multiplier operable to generate a time varying power signal from the time varying DC signal; and
   an integrator operable to accumulate the interfering energy in the data signal.

7. A method for monitoring a communication link in a cable television communication system, the method comprising:
   interfacing a Cable Modem Termination System (CMTS) with the communication link to receive a signal conveyed over the communication link;
   tracking energy across a frequency spectrum of the signal for a predetermined period of time;
   flagging, at intervals of the predetermined period of time, energy levels across the frequency spectrum of the signal that breach a threshold energy level to identify where in the frequency spectrum a breach of the threshold energy level occurs; and
   adding the flags to determine how long the threshold energy level was breached during the predetermined period of time
wherein:
   the communication link is an opto-electrical communication link;
   the signal is an optical communication signal conveying a digitized upstream Radio Frequency (RF) signal of a cable television communication system, and the method further comprises directing a node of the cable television communication system to change a modulation scheme of the RF signal to overcome interfering energy in the signal.

8. The method of claim 7, further comprising:
generating a grid plot of the energy of the signal in a frequency-versus-time format for the predetermined period of time.

9. The method of claim 7, further comprising:
flushing the added flags after the predetermined period of time; and
monitoring the communication link for another predetermined period of time in response to flushing the added flags.

10. The method of claim 7, further comprising:
amplifying the signal to generate a Direct Current (DC) signal having a voltage proportional to a voltage of the signal conveyed over the communication link;
tracking the voltage of the DC signal for the predetermined period of time;
generating a flag at discrete voltage levels when the voltage of the DC signal breaches each discrete voltage level; and
adding each flag at each discrete voltage level to determine how long each discrete voltage level was breached during the predetermined period of time.

11. The method of claim 7, further comprising:
accumulating an amount of the interfering energy in the signal; and
recommending an error correction scheme that will be effective given the amount of the interfering energy in the signal.

12. The method of claim 7, further comprising:
accumulating an amount of the interfering energy in the signal, wherein accumulating comprises:
filtering the signal to isolate a data signal in the signal conveyed over the communication link;
generating a time varying DC signal from the filtered data signal;
generating a time varying power signal from the time varying DC signal; and
integrating the DC signal to accumulate the interfering energy in the data signal.

* * * * *

UNITED STATES PATENT AND TRADEMARK OFFICE
CERTIFICATE OF CORRECTION

PATENT NO. : 9,622,097 B2  
APPLICATION NO. : 14/621842  
DATED : April 11, 2017  
INVENTOR(S) : Thomas H. Williams It is certified that error appears in the above-identified patent and that said Letters Patent is hereby corrected as shown below:

On the Title Page

Item (54): and in the Specification, Column 1, Line 2 of the title, should read as:
ENERGY MONITORING IN A COMMUNICATION LINK.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*